US012769504B2

(12) United States Patent
Ramos et al.

(10) Patent No.: US 12,769,504 B2
(45) Date of Patent: Oct. 20, 2026

(54) TUNING ESTIMATION AND MODIFICATION

(71) Applicant: MOISES SYSTEMS, INC., Salt Lake City, UT (US)

(72) Inventors: Geraldo Ramos, Salt Lake City, UT (US); Filip Korzeniowski, Vienna (AT); Eddie Hsu, João (BR)

(73) Assignee: MOISES SYSTEMS, INC., Salt Lake City, UT (US)

( * ) Notice: Subject to any disclaimer, the term of this patent is extended or adjusted under 35 U.S.C. 154(b) by 254 days.

(21) Appl. No.: 18/604,096

(22) Filed: Mar. 13, 2024

(65) Prior Publication Data

US 2024/0329918 A1 Oct. 3, 2024

Related U.S. Application Data

(60) Provisional application No. 63/492,746, filed on Mar. 28, 2023.

(51) Int. Cl.
*G06F 3/16* (2006.01)
*G06F 3/04847* (2022.01)

(52) U.S. Cl.
CPC .......... *G06F 3/165* (2013.01); *G06F 3/04847* (2013.01)

(58) Field of Classification Search
None
See application file for complete search history.

(56) References Cited

U.S. PATENT DOCUMENTS

| | | | | |
|---|---|---|---|---|
| 8,907,195 | B1 * | 12/2014 | Erol | G10H 1/361 84/649 |
| 10,013,963 | B1 * | 7/2018 | Ka | G10H 1/32 |
| 2006/0027074 | A1 * | 2/2006 | Masuda | G10G 7/02 84/454 |
| 2009/0056523 | A1 * | 3/2009 | Park | G10G 7/02 84/455 |
| 2011/0003638 | A1 * | 1/2011 | Lee | G10H 1/368 463/43 |
| 2012/0266738 | A1 * | 10/2012 | Evans | G10H 1/368 84/609 |
| 2014/0041510 | A1 * | 2/2014 | Yui | G10G 7/02 84/454 |
| 2014/0202316 | A1 * | 7/2014 | Szalay | G10H 1/0066 84/645 |
| 2018/0277069 | A1 * | 9/2018 | Jalgha | G10D 3/14 |
| 2018/0315404 | A1 * | 11/2018 | Cram | G06F 3/023 |
| 2021/0073275 | A1 * | 3/2021 | Coover | G06F 18/40 |
| 2023/0022204 | A1 * | 1/2023 | Aviv | G10H 1/0091 |
| 2023/0368759 | A1 * | 11/2023 | Johnson | G10H 1/361 |

* cited by examiner

*Primary Examiner* — Toan H Vu
(74) *Attorney, Agent, or Firm* — Workman Nydegger

(57) ABSTRACT

A system may be configurable to (i) access an audio signal, (ii) determine an estimated tuning pitch associated with the audio signal, (iii) present the estimated tuning pitch on a user interface, (iv) receive user input directed to modifying a playback tuning pitch of the audio signal to deviate from the estimated tuning pitch, (v) modify the playback tuning pitch of the audio signal based upon the user input, (vi) receive additional user input directed to causing playback of the audio signal in accordance with the modified playback tuning pitch, and (vii) play the audio signal in accordance with the modified playback tuning pitch.

18 Claims, 9 Drawing Sheets

700

800

TUNING ESTIMATION AND MODIFICATION

CROSS-REFERENCE TO RELATED APPLICATIONS

This application claims priority to U.S. Provisional Patent Application No. 63/492,746, filed on Mar. 28, 2023, and entitled "TUNING ESTIMATION AND MODIFICATION", the entirety of which is incorporated herein by reference for all purposes.

BACKGROUND

A "tuning standard" is a reference pitch to which a group of musical instruments is tuned (e.g., for a musical performance or practice session). Modern musicians typically tune their instruments in accordance with the international pitch standard, which uses 440 Hz for A above middle C as a reference note, with the other notes being set relative to it. However, tuning standards can vary for different musical ensembles and have varied throughout history.

For instance, some non-electronic instruments such as wall pianos and grand pianos are tuned to different frequencies for A above middle C, such as 443 Hz, 444 Hz, 445 Hz, etc. As another example, some orchestras or other groups use a standard of 441 Hz or 442 Hz. Furthermore, many songs recorded using a mechanical medium (e.g., a non-digital medium) may reflect pitch distortions that are due to the recording medium itself and that are perceptible during playback. For instance, many songs recorded during the 1970's, 1980's, and 1990's were recorded using tape recorders, and the tape velocity of the recordings causes pitch distortions relative to the 440 Hz tuning standard.

Modern musicians often utilize song recordings in their practice sessions. Unfortunately, many song recordings that modern musicians desire to use in their practice sessions capture instruments that (i) were not tuned in accordance with the 440 Hz tuning standard or (ii) reflect distortions relative to the 440 Hz tuning standard (e.g., brought about by recording of the song via a non-digital recording medium). Musicians often thus experience frustration when attempting to use such song recordings during practice sessions.

The subject matter claimed herein is not limited to embodiments that solve any challenges or that operate only in environments such as those described above. Rather, this background is only provided to illustrate one exemplary technology area where some embodiments described herein may be practiced.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Figure 1:
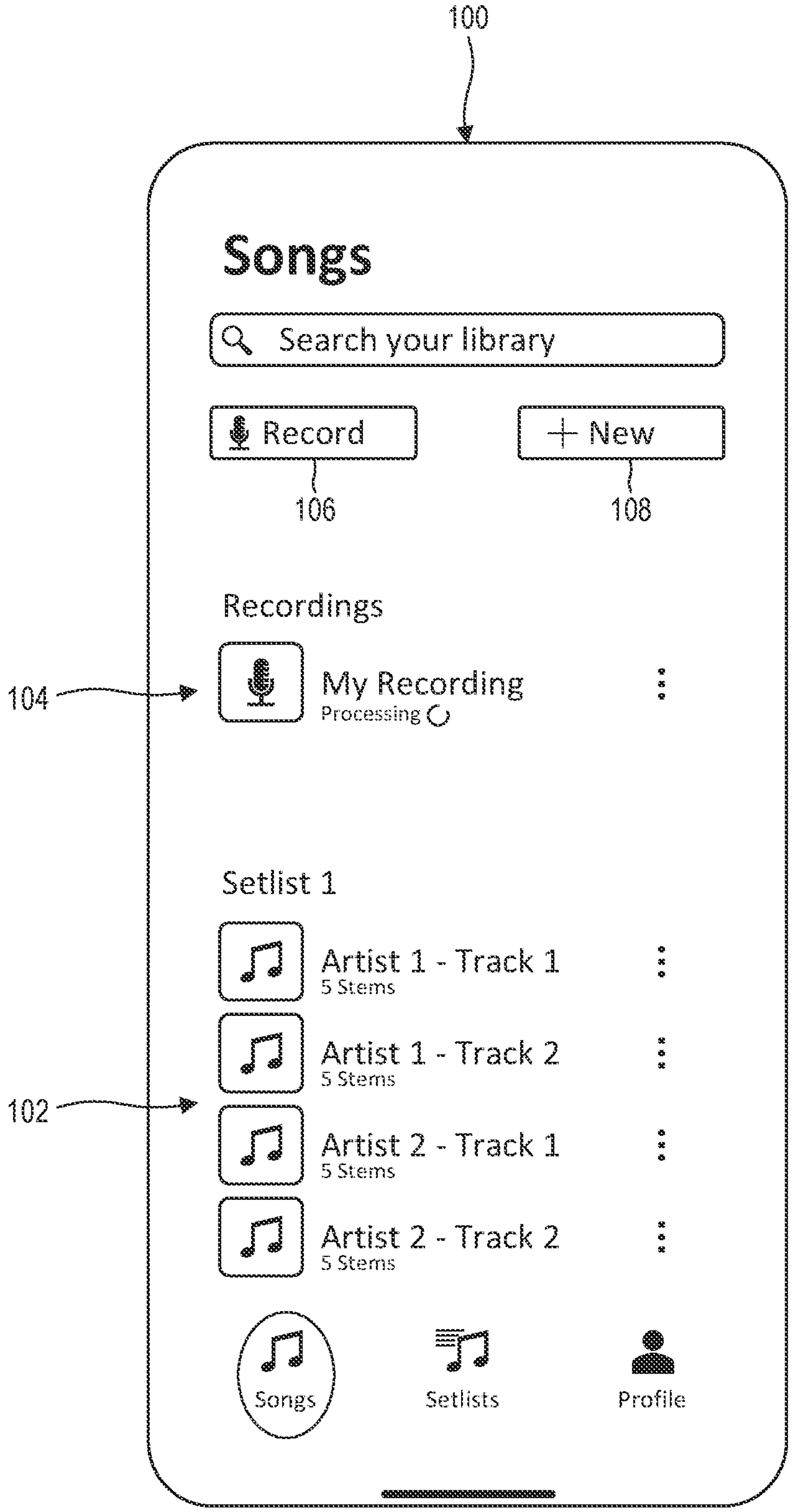
FIG. 1 illustrates an example user interface for facilitating selection of audio content for processing.

As used herein, "pitch" refers to a reference pitch to which a musical instrument or audio content is tuned (or is estimated to be tuned).

As noted above, modern musicians often utilize song recordings in their practice sessions. However, many song recordings capture instruments that were not tuned in accordance with the 440 Hz tuning standard or reflect distortions relative to the 440 Hz tuning standard, which can cause frustration for musicians.

One conventional approach employed by musicians to account for such pitch discrepancies between their instrument(s) and a recorded song include attempting to change the tuning of their instrument(s) to match the pitch of the recorded song. Another conventional approach includes utilizing pitch modification software that enables users to distort upward or distort downward the pitch of a song recording (e.g., using a sliding scale or incremental adjustment feature). Musicians use such pitch modification software to manually adjust the pitch of the recorded song to match the pitch of their instrument(s).

Both of the aforementioned approaches for managing discrepancies between the pitch of a musician's instrument(s) and the pitch of a recorded song are cumbersome and time-consuming-detracting from the musician's practice session. Such approaches are also imprecise, with musicians typically relying on their sense of hearing throughout a process of incremental adjustment to detect when the pitch discrepancy is sufficiently small to proceed. Accordingly, there exists a need for systems, methods, and techniques for tuning estimation and modification.

At least some disclosed embodiments enable users to select audio content (e.g., including an audio signal) for processing. For example, a user may select a recording file from a library of recording files, upload a locally stored recording file, or select an audio stem for tuning estimation. The selected audio content may then be processed to determine the estimated tuning pitch of the audio content. The estimated tuning pitch can comprise an estimated reference pitch or reference note to which one or more musical sources (e.g., musical instruments, vocals) represented in the audio content are estimated to be tuned (or to be playing or singing in tune with). For instance, the estimated tuning pitch can comprise an estimated concert pitch applicable to the audio content as a whole, or an estimated tuning pitch for an individual instrument (or music stem) represented in the audio content.

The estimated tuning pitch for the audio content may then be presented to the user via a user interface (e.g., for visual, aural, or tactile reception by the user). The estimated tuning pitch for the audio content may be presented in various formats, such as a reference note (or concert pitch or tuning note), a frequency estimation for a reference note (e.g., 430 Hz, 444 Hz, etc.), a deviation from a target playback tuning pitch (e.g., −10 Hz, +4 Hz, etc., or as a deviation in cents or notes), or in another format. A target playback tuning pitch can comprise a target reference pitch or target reference note to which one or more musical sources (e.g., musical instruments, vocals) represented in the audio content are desired, intended, or targeted to be perceived as being in tune with during playback. A target playback tuning pitch may be predetermined or dynamically detected/obtained and may comprise, by way of non-limiting example, an applicable tuning standard (e.g., the international pitch standard or another standard), the pitch to which a musician's particular instrument(s) is/are tuned (which may be detected at runtime, such as by recording playing of the musician's instrument(s)), or any user-selected pitch.

The user may then provide user input to facilitate modification of the pitch associated with the audio content. For instance, the user may provide user input directed to modifying the pitch for the audio content to approach or match a target playback tuning pitch (e.g., a pitch dictated by an applicable tuning standard, or a pitch to which the user's instrument(s) is/are tuned). The user input may take on any form, such as touch input, voice input, gesture input, etc. Based upon the user input, a system may modify the pitch for the audio content (e.g., to match or approach the target playback tuning pitch).

The pitch modification processing may produce or enable playback of pitch-adjusted audio content. Advantageously, in at least some implementations, the pitch-adjusted audio content may substantially match the tuning of the user's musical instrument(s), enabling the user to utilize the pitch-adjusted audio content for a musical session in an improved manner.

In some implementations, a system refrains from presenting the estimated tuning pitch for the audio content to the user and instead receives a command, or is pre-configured, to automatically adjust the tuning pitch for the audio content to approach or match a target playback tuning pitch.

Tuning estimation and/or modification as described herein may be performed for a piece of audio content as a whole (e.g., a concert pitch for all audio stems represented in the audio content) or on a more granular basis. For instance, pitch estimation and/or modification may be performed on a per-stem, per-channel, or per-track basis, such as by detecting different pitch estimations for different musical instruments and/or musical components represented in audio content, each of which may be selectively modifiable after detection. In this regard, stem, channel, or track separation may be performed on audio content in conjunction with or as a precursor to performing tuning estimation and/or modification.

The functionality described herein related to tuning estimation and/or modification may be provided using any suitable processing component(s) (e.g., local and/or remote/cloud resources) and may be accessible using any suitable user interface(s) (e.g., via an application and/or website accessible via a mobile electronic device such as a smartphone or tablet, a desktop or laptop computer, a wearable device, etc.). Additional details related to implementing the disclosed embodiments will be provided hereinafter.

Having just described some of the various high-level features and benefits of the disclosed embodiments, attention will now be directed to the Figures, which illustrate various conceptual representations, architectures, methods, and/or supporting illustrations related to the disclosed embodiments.

FIG. 1 illustrates an example user interface 100 for facilitating selection of audio content for processing. One or more aspects of the user interface 100 (and other user interfaces described herein) can be presented on various types of devices or systems, such as smartphones, tablets, laptop computers, desktop computers, wearable devices, and/or other devices (e.g., which devices or systems can correspond to or include components of system 900, described hereinafter with reference to FIG. 9). The user interface 100 can be presented on a user device in association with operation of a downloaded and/or web-based (e.g., server- or cloud-based) application (e.g., a music software application).

In the example shown in FIG. 1, the user interface 100 provides access to various audio content (e.g., audio signals) in the form of audio tracks 102 and audio recordings 104. The audio content may comprise one or more locally and/or remotely stored audio or recording files. In some instances, selected audio content may comprise an audio stream (e.g., provided by a web streaming service, radio-based service, satellite service, line-in connection, etc.). In some implementations audio content may be added to the audio tracks 102 and/or the audio recordings 104 displayed in the user interface 100 via one or more user actions. For example, the user interface 100 includes a record button 106 and an add button 108. The record button 106 may be selectable via user input to facilitate recording of an audio file for inclusion with the audio recordings 104. Similarly, the add button 108 may be selectable via user input to facilitate selection of additional audio files/tracks (e.g., from a local or remote repository, or by selecting one or more music streaming or radio or other audio services) for inclusion with the audio tracks 102.

In some instances, the audio content represented in a user interface 100 includes one or more audio stems. For example, each of the audio tracks 102 are displayed in conjunction with an indicator of the quantity of audio stems (e.g., "5 Stems") associated with the respective audio track. Audio stems can refer to the component parts of a complete musical track, such as vocals, drums, bass, guitar, keys/piano, and/or other sources of audio.

In the example shown in FIG. 1, the audio recordings 104 includes a newly recorded file referred to herein as "My Recording". My Recording may have been recorded after selection of the record button 106 of the user interface 100. The user interface 100 of FIG. 1 conceptually depicts processing of the My Recording file with the "Processing" label proximate to the My Recording label. The processing of audio content as indicated in FIG. 1 can comprise performing stem separation (e.g., to isolate individual audio stems represented in the audio content from one another). The processing of audio content can additionally or alternatively include determining an estimated tuning pitch for the selected audio content. For instance, after selection of audio content shown in the user interface 100 (or after selection of audio content to add to the user interface 100), the audio content may be processed (e.g., via local computing resources and/or remote resources, such as cloud resources) to determine an estimated tuning pitch. The estimated tuning pitch may be determined for the audio content as a whole (e.g., a concert pitch) or for different components represented in the audio content (e.g., respective pitches for different stems/channels). As noted above, the estimated tuning pitch can comprise an estimated tuning pitch or reference pitch or reference note to which one or more musical audio stems represented in the audio content are estimated to be tuned (or playing/singing in tune with).

Additional details related to an example process for determining an estimated tuning pitch for audio content will now be provided. In some instances, a system calculates the frequency histogram of the audio signal (e.g., input audio content) and compares it to the idealized template histograms of all possible concert pitches. The concert pitch with the template histogram that best matches the actual histogram may then be selected as the estimated tuning pitch for the audio signal.

In some implementations, processing for determining estimated tuning pitch may operate on the assumption that all musical instruments are tuned using equal-temperament 12-tone tuning, with a maximum deviation from 440 Hz of a semi-tone (e.g., causing estimated tuning pitch to be within a range of 428 Hz and 452 Hz). One will appreciate, in view of the present disclosure, that such assumptions may be varied and/or omitted without departing from the principles disclosed herein.

In one example implementation, calculation of an estimated tuning pitch for an input audio signal is performed as follows:

Step 1: Utilize the discrete Fourier transform (or other transformation operation) to compute the spectrogram S of the audio signal x. A Hann window (or another type of window function) may be applied to N=16384 samples (or another quantity of samples) with a hop size of H=8192 (or another hop size). The logarithm of a linear transformation of the spectrogram may then be taken, and the average over time to obtain L (f) may be computed, which may be denoted by:

$$S(t, f) = \sum_{n=0}^{N-1} x[n + tH] \cdot w[n] \cdot e^{-j \cdot 2\pi \cdot f \cdot \frac{n}{N}}$$

$$L(f) = \frac{1}{T} \sum_{t=0}^{T} \log(\gamma \cdot S(t, f) + 1)$$

Step 2: Estimate the spectral energy of each cent in each semitone between the notes of C1 and C8 (or another note range) using piecewise cubic spline interpolation (or another interpolation technique) assuming a reference concert pitch of 440 Hz (or another tuning standard or target playback tuning pitch). The estimated energy may be denoted by $L_c(f_c)$:

$$L_c(f_c) = CSI(f_c, L)$$

where CSI represents cubic spline interpolation.

Step 3: Normalize the energy of each bin by, for example, subtracting the local average energy in a window of 101 cents (1 semitone, or another range), and rectify the filtered spectrogram to obtain, for instance:

$$F(f_c) = [L_c(f_c) - avg(L_c(f_c); 101)]^+$$

where $[\cdot]^+$ is the half-wave rectifier function, and $$avg(x, N) = \frac{1}{N} \sum_{k=\frac{-N-1}{2}}^{N-1} 2x[n-k]$$

is the running local average.

Other normalization techniques may be utilized in accordance with implementations of the present disclosure.

Step 4: Estimate the deviation from the concert pitch of 440 Hz (or another tuning standard or target playback tuning pitch) by computing a matching score between the filtered energy histogram F and template histograms $T_d$ and selecting the best match:

$$\hat{d} = \text{argmax}_d = \sum_f F(f_c) \cdot T_d(f_c)$$

The estimated concert pitch for the audio signal can then be computed using:

$$\hat{\theta} = 440 \cdot 2^{\hat{d}/1200}$$

One will appreciate, in view of the present disclosure, that the particular aspects of the steps/operations described hereinabove may be varied without departing from the principles of the present disclosure, and that additional or alternative steps/operations may be utilized. As noted hereinabove, estimated tuning pitch may be obtained for individual stems/components of audio content.

After processing of audio content as described above (e.g., to achieve stem separation, pitch estimation, etc.), the audio content may be accessed and/or interacted with in various ways. For instance, the audio tracks 102 as represented in the user interface 100 may have already been processed to determine the separated stems and the estimated tuning pitch, and the audio tracks 102 may be selectable within the user interface 100 for further interaction with the audio content underlying the audio tracks 102 and/or with artifacts/outputs resulting from processing of the audio tracks 102. Similarly, after completion of the processing of the My Recordings file as conceptually depicted in FIG. 1 (or before initiation or completion of the processing), the My Recordings file may be selected within the user interface 100 for further interaction with its associated content (and/or outputs from the processing, such as separated stems and/or estimated tuning pitch).

Figure 2:
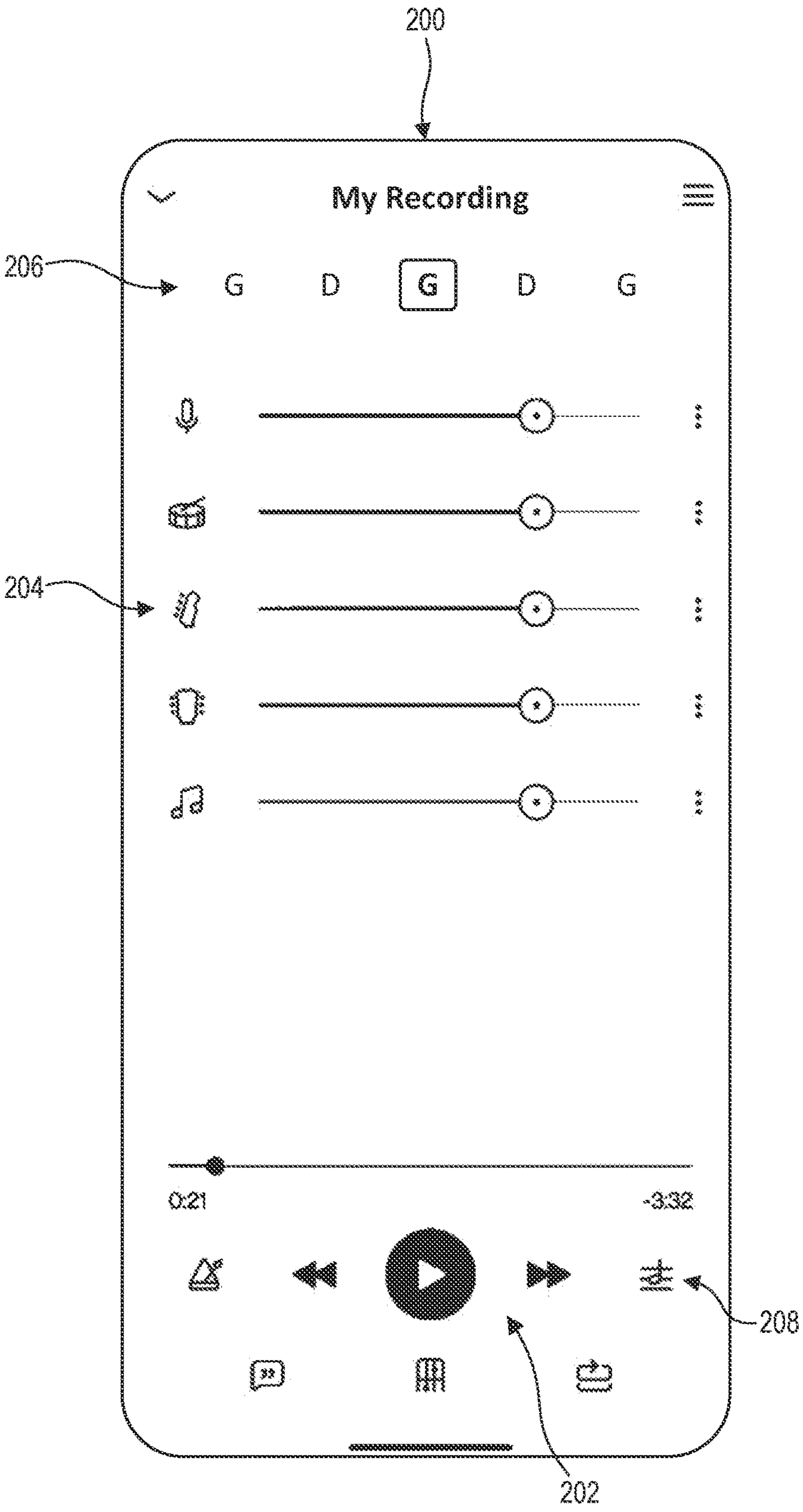
FIG. 2 illustrates an example user interface for controlling playback of selected audio content.

FIG. 2 illustrates an example user interface 200 that includes various elements for interacting with audio content and/or processing outputs associated with selected audio content. For instance, user interface 200 can be presented on a user device after selection of the My Recording file of the user interface 100 discussed hereinabove with reference to FIG. 1. The user interface 200 of FIG. 2 includes playback controls 202, which include a play/pause elements, fast-forward and rewind (or skip) elements, and a navigation bar (e.g., indicating playback progress and facilitating scrubbing/navigating through the selected audio content). The user interface 200 of FIG. 2 further includes a stem control region 204, which includes icons associated with various audio stems represented in the My Recording audio content (e.g., vocals at the top, followed in descending order by drums, bass, guitar, and remaining audio). The stem control region 204 also includes volume control sliders for adjusting the volume of individual audio stems of the My Recording content, which can enable removal, emphasis, de-emphasis, isolation, and/or other adjustments to individual audio stems during playback. The user interface 200 of FIG. 2 furthermore includes a chord indicator region 206, which can display chords associated with the portion of the audio content currently being played back (or currently queued for playback, such as when playback is paused). The chords of the audio content can be determined during the processing discussed hereinabove.

The example user interface 200 shown in FIG. 2 furthermore includes a pitch control element 208, which can facilitate viewing of the estimated tuning pitch determined via the processing noted above and/or modification of the playback tuning pitch for the applicable audio content (e.g., the My Recording audio file, and/or stems or combinations of stems thereof).

Figure 3:
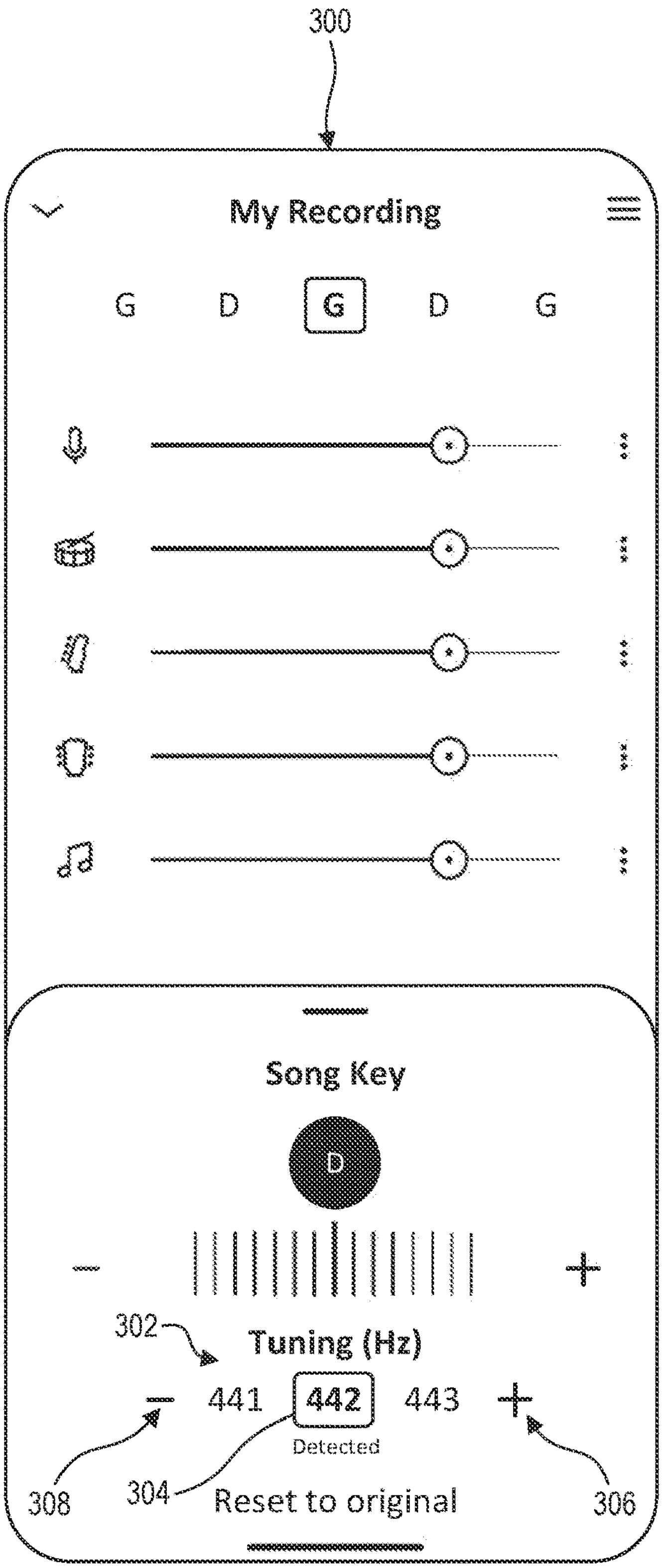
FIG. 3 illustrates an example user interface for presenting an estimated tuning pitch for selected audio content.

FIG. 3 illustrates an example user interface 300 for presenting an estimated tuning pitch of audio content. For instance, the user interface 300 can be presented after selection of the pitch control element 208 discussed hereinabove with reference to FIG. 2, and the user interface 300 can display pitch information and/or facilitate pitch modification for the My Recording audio file (and/or stems or combinations of stems thereof).

In the example shown in FIG. 3, the user interface 300 includes a tuning pitch indicator 302, which can indicate the estimated tuning pitch for the selected audio content (e.g., determined via the processing noted above). In the example shown in FIG. 3, the tuning pitch indicator 302 depicts a tuning pitch of 442 Hz in association with a "Detected" label, which indicates that the 442 Hz tuning pitch comprises the estimated tuning pitch determined via the processing of the selected audio content (e.g., My Recording). As noted above, although the tuning pitch indicator 302 depicts tuning pitches using frequency, other forms can be used (e.g., reference or tuning notes). The tuning pitch indicator 302 of the user interface 300 can thus present the estimated tuning pitch to users, which may enable users to readily perceive whether the apparent pitch associated with audio content (e.g., My Recording) deviates from some target playback tuning pitch (e.g., 440 Hz, or another tuning standard, or a dynamically detected tuning state of the user's instrument(s)).

The tuning pitch indicator 302 can additionally, or alternatively, indicate the playback tuning pitch for the selected audio content (e.g., the My Recording audio file, and/or one or more stems thereof). The playback tuning pitch can comprise the tuning pitch that one or more musical sources (e.g., musical instruments, vocals) represented in the selected audio content are intended to be perceived as playing/singing in tune with during playback of the audio content. In the example shown in FIG. 3, the tuning pitch indicator 302 includes a selector box 304, which can be configured to emphasize or indicate the playback tuning pitch applicable to the selected audio content for playback of the selected audio content. In the instance illustrated in FIG. 3, the selector box 304 emphasizes (or surrounds) the tuning pitch of 442 Hz, which is the estimated tuning pitch for the selected audio content as discussed above. Under such a configuration, the selected audio content may be played back using 442 Hz as the playback tuning pitch, which can cause the audio content to be perceived, during playback, as being in tune with a 442 Hz tuning frequency.

As noted hereinabove, a user may provide user input to facilitate modification of the playback tuning pitch for the audio content that was processed to determine the estimated tuning pitch. Such a modification may enable the audio content to be perceived, during playback, as being in tune with different tuning pitches. Such functionality can enable playback of the audio content to be modified to be perceived as in tune with a desired target playback tuning pitch (e.g., a tuning standard, such as 440 Hz, or a current tuning pitch of a musician's instrument(s), or any selected tuning pitch). Modification of the audio content (or playback thereof) based on a selected/modified playback tuning pitch may be accomplished in various ways, such as, by way of non-limiting example, digital signal processing (DSP), time-stretching, pitch-shifting, harmonic editing, physical modeling, and/or others.

FIG. 3 illustrates the tuning pitch indicator 302 of the user interface 300 as including an increase element 306 and a decrease element 308, which may be interactable to facilitate changing of the playback tuning pitch of the selected audio content (i.e., My Recording). FIG. 3 also illustrates the tuning pitch indicator 302 as including multiple discrete pitch values available for user selection as the playback tuning pitch (e.g., 441 Hz, 443 Hz). One will appreciate, in view of the present disclosure, that any form(s) of user input may be provided to facilitate modifying of a playback tuning pitch for selected audio content (e.g., sliding or tapping input directed to one or more elements of the tuning pitch indicator 302, or other types of user input).

Figure 4:
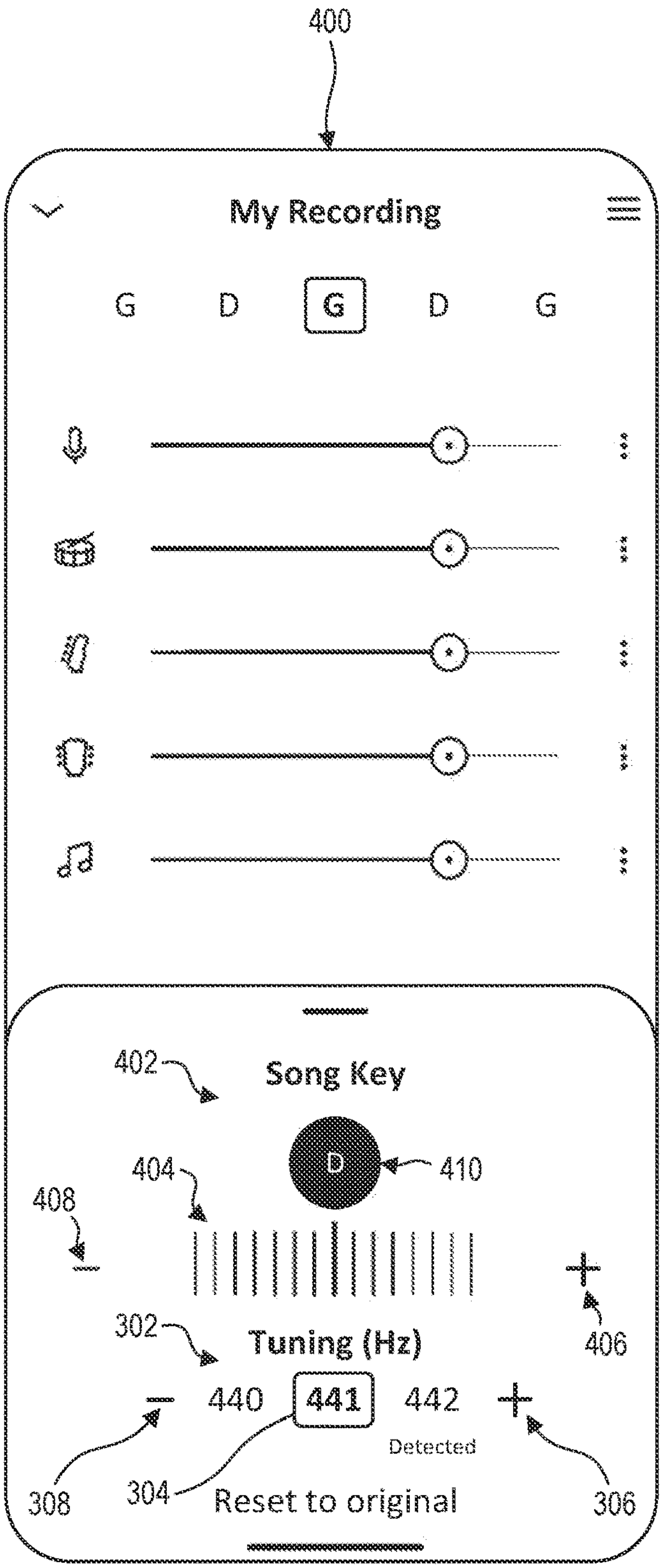
FIG. 4 illustrates an example user interface for facilitating selective modification of the playback tuning pitch for selected audio content to correspond to a target playback tuning pitch.

FIG. 4 illustrates a user interface 400 after user input has been directed to the tuning pitch indicator 302 (e.g., to the increase element 306 or the decrease element 308) to accomplish a changing of the playback tuning pitch for the selected audio content. In the example shown in FIG. 4, the playback tuning pitch has been changed to 441 Hz, as indicated by the 441 Hz tuning pitch being positioned within the selector box 304. The user interface 400 illustrates the "Detected" label persisting in association with the 442 Hz tuning frequency, which can continue to communicate to users the tuning frequency detected for the selected audio content via the processing noted above.

Under the configuration shown in FIG. 4 (e.g., with the 441 Hz playback tuning pitch selected), the selected audio content may be played back using 441 Hz as the playback tuning pitch, which can cause the audio content to be perceived, during playback, as being in tune with a 441 Hz tuning frequency. The user-selected playback tuning pitch (e.g., indicated by the selector box 304 in FIGS. 3 and 4) may be regarded as a target playback tuning pitch.

Playback of the selected audio content may be modified to correspond to a particular target playback tuning pitch in various ways. For instance, the target playback tuning pitch may be selected via predefined user settings, and the user may issue a command at a user interface associated with playback of audio content (or otherwise confirm user intent to modify the playback tuning pitch) to cause the audio content to be played back in accordance with the preconfigured target playback tuning pitch (e.g., rather than manually navigating to the desired playback tuning pitch at the time of playback). As another example, the target playback tuning pitch may be determined by recording of a musician's instrument (e.g., using techniques described hereinabove for determining estimated tuning pitch), and the audio content may be automatically adjusted (or adjusted after receiving a user command or confirmation of intent) to play back in accordance with the target playback tuning pitch determined based on the recording of the musician's instrument.

Advantageously, the playback of the audio content (e.g., My Recording) using a target or selected playback tuning pitch may enable the audio content to be in tune with the user's musical instrument(s), enabling the user to utilize the audio content for a musical session in an improved manner. For instance, after selecting a playback tuning pitch as discussed above, a user may interact with playback elements of a user interface (e.g., playback controls 202 of user interface 200) to facilitate or cause playback of the selected audio content according to the selected or target playback tuning pitch.

Although the examples provided hereinabove with reference to FIGS. 3 and 4 focus, in at least some respects, on presenting components of the tuning pitch indicator 302 in a particular manner, aspects of a tuning pitch indicator 302 as described herein may be presented in other ways. For instance, the estimated tuning pitch may be presented as a standalone element within a user interface, separate from features for selecting a playback tuning pitch or target playback tuning pitch. As another example, functionality for selecting a playback tuning pitch or target playback tuning pitch can be implemented as a dropdown list or menu, or in any other format. Furthermore, one will appreciate, in view of the present disclosure, that the particular selection and format of the elements discussed with respect to the user interfaces of FIGS. 1 through 5 are provided by way of example only and is not limiting of the principles disclosed herein (e.g., user interfaces may incorporate or omit various elements described in association with the user interfaces of FIGS. 1 through 5).

Figure 5:
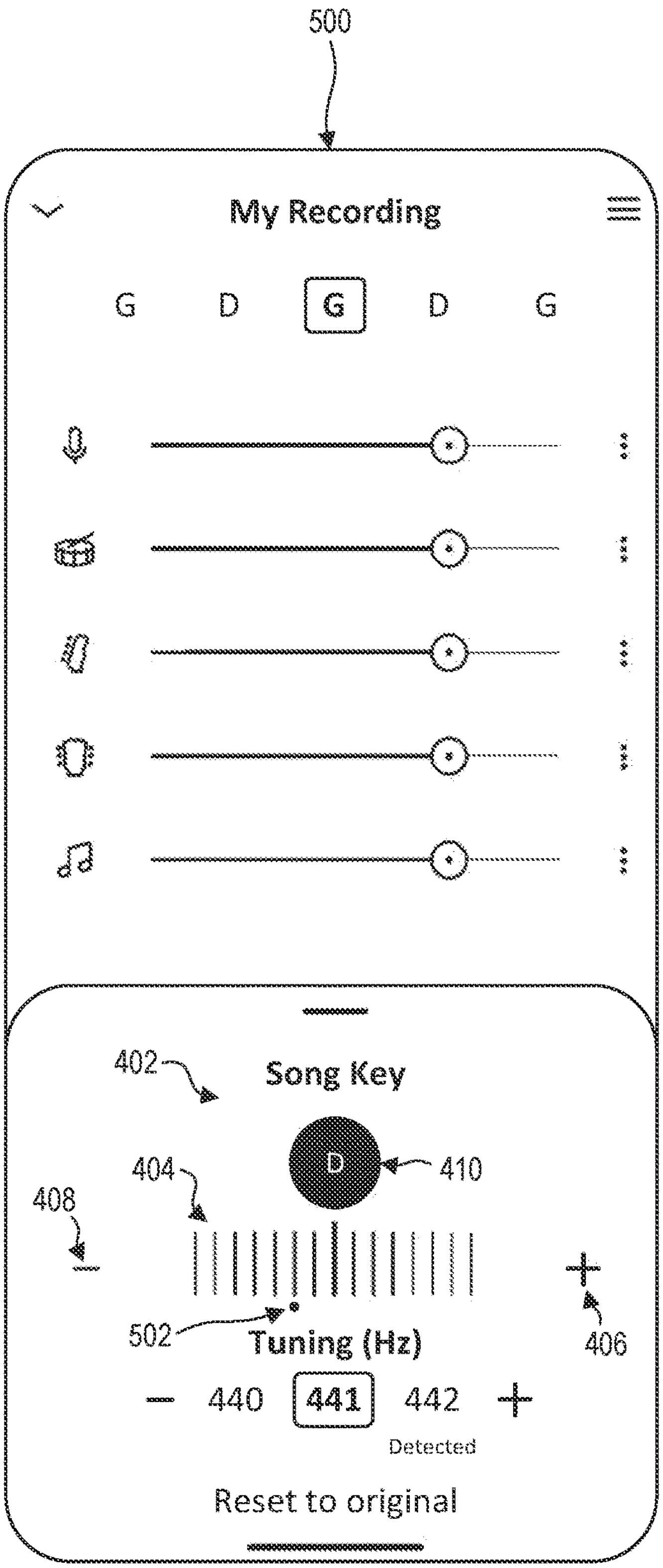
FIG. 5 illustrates an example user interface for facilitating selective modification of the playback key for selected audio content.

In some instances, modifications to playback tuning pitch can be provided in conjunction with other modifications to playback pitch. For instance, FIG. 4 illustrates a song key region 402, which can indicate the key in which the selected audio content is determined to be played (such information can be determined via the processing of the audio content described hereinabove). The song key region 402 can include interactable elements (e.g., a navigation bar 404, an increase element 406, a decrease element 408) to facilitate selection of a playback key for the audio content. The playback key can be indicated in the song key region 402 by an indicator 410. The playback key can comprise the song key that the audio content is intended to be perceived as being played in during playback of the audio content. FIG. 5 depicts a user interface 500 in which the playback key indicated by the indicator 410 has been changed (e.g., after user input directed to one or more elements of the song key region 402, such as the navigation bar 404, the increase element 406, and/or the decrease element 408). The user interface 500 includes a marker 502 to indicate the original song key detected for the selected audio content. Pitch modification to audio content can thus be facilitated in multiple ways simultaneously or under multiple paradigms (e.g., pitch modification based on playback tuning pitch and/or pitch modification based on playback key).

The following discussion now refers to a number of methods and method acts that may be performed in accordance with the present disclosure. Although the method acts are discussed in a certain order and illustrated in a flow chart as occurring in a particular order, no particular ordering is required unless specifically stated, or required because an act is dependent on another act being completed prior to the act being performed. One will appreciate that certain embodiments of the present disclosure may omit one or more of the acts described herein.

Figure 6:
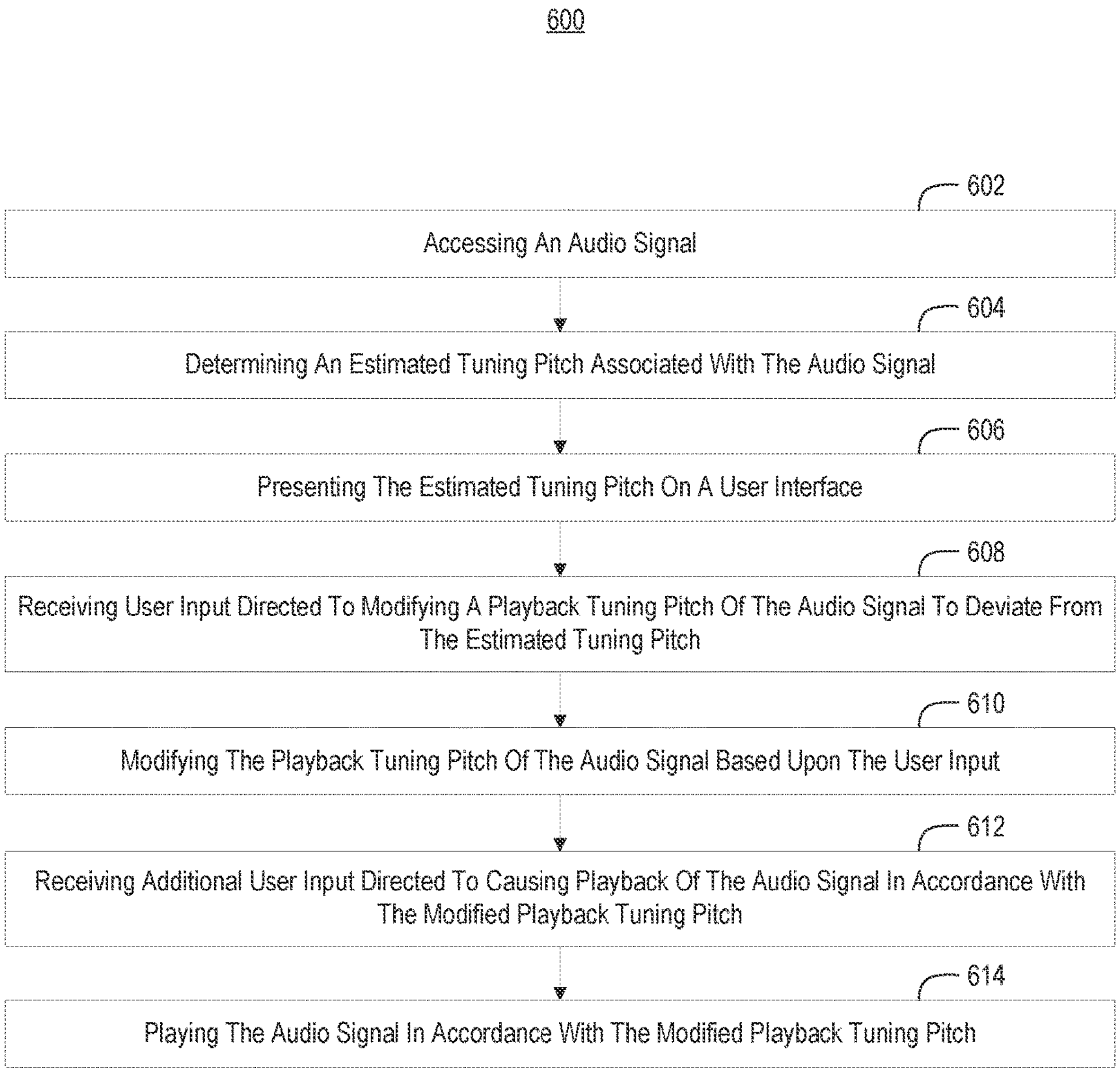
FIGS. 6, 7, and 8 illustrate example flow diagrams depicting acts associated with facilitating tuning estimation and modification.
Figure 7:
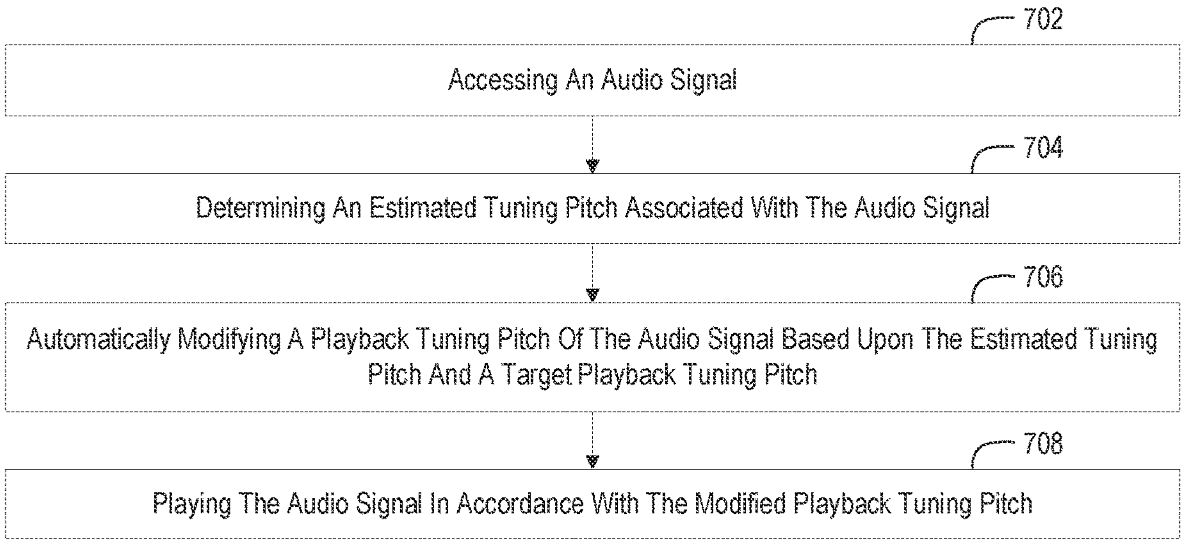
Figure 8:
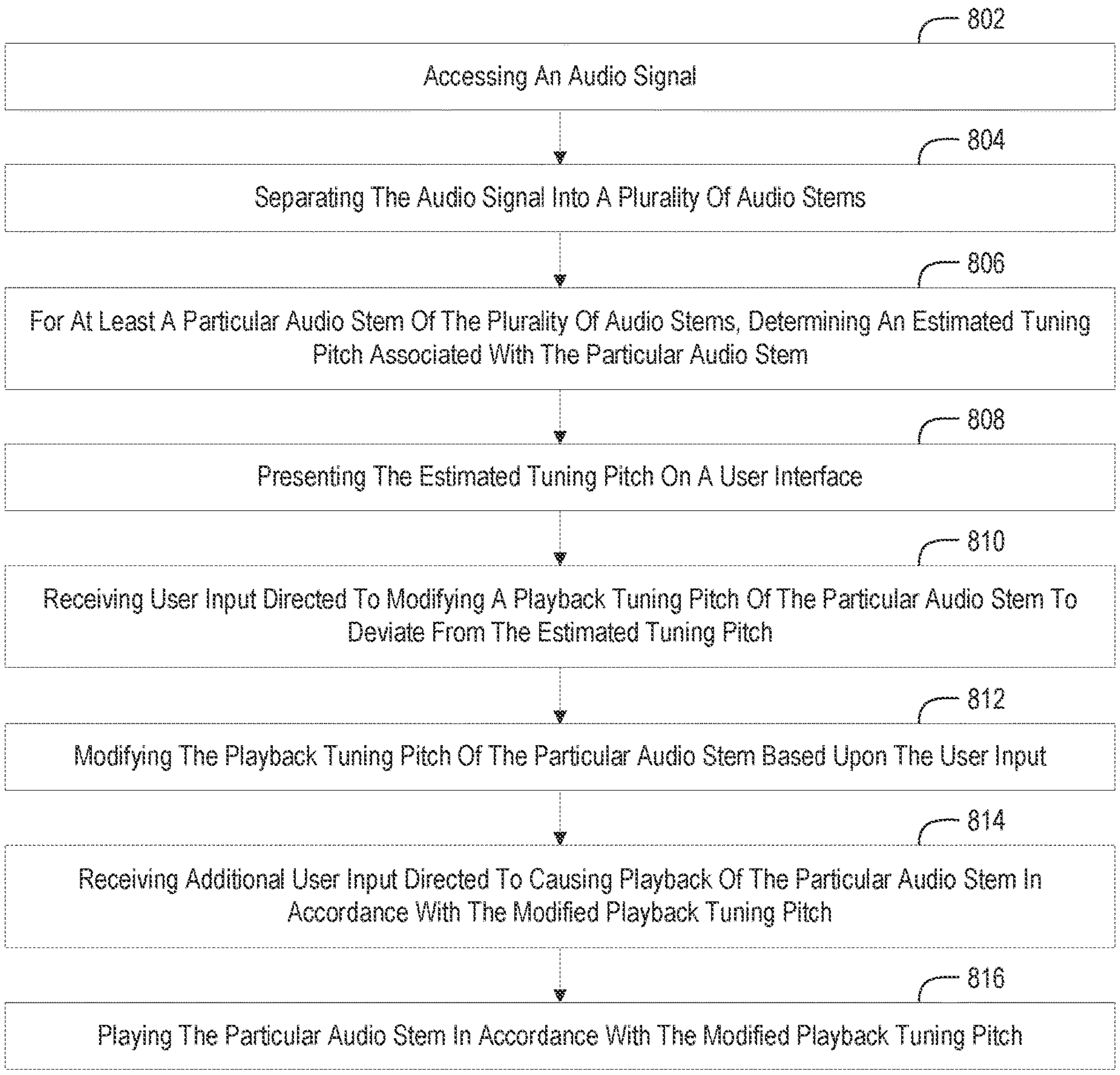

FIGS. 6, 7, and 8 illustrate example flow diagrams 600, 700, and 800, respectively, depicting acts associated with facilitating tuning estimation and modification. The acts described with reference to FIGS. 6, 7, and 8 can be performed using one or more components of one or more systems 900 described hereinafter with reference to FIG. 9, such as processor(s) 902, storage 904, sensor(s) 906, I/O system(s) 908, communication system(s) 910, remote system(s) 912, etc.

Act 602 of flow diagram 600 of FIG. 6 includes accessing an audio signal. In some instances, the audio signal comprises an audio recording of a song. In some implementations, the audio signal comprises an audio stem separated from an audio recording of a song.

Act 604 of flow diagram 600 includes determining an estimated tuning pitch associated with the audio signal. In some examples, the estimated tuning pitch is obtained by determining a frequency histogram of the audio signal and comparing the frequency histogram to template histograms associated with different tuning pitches to determine a matching template histogram. The estimated tuning pitch can be selected as the tuning pitch associated with template histogram that best matches the frequency histogram of the audio signal. In some instances, the estimated tuning pitch comprises an estimated concert pitch applicable to a song. In some implementations, the estimated tuning pitch comprises an estimated tuning pitch associated with an audio stem. In some examples, the estimated tuning pitch comprises a frequency deviation from a target playback tuning pitch. In some instances, the target playback tuning pitch is determined based on an audio recording of a musical instrument. In some implementations, the target playback tuning pitch comprises a user-selected pitch value. In some examples, the estimated tuning pitch comprises a frequency estimation for a reference note.

Act 606 of flow diagram 600 includes presenting the estimated tuning pitch on a user interface.

Act 608 of flow diagram 600 includes receiving user input directed to modifying a playback tuning pitch of the audio signal to deviate from the estimated tuning pitch. In some instances, the user input comprises user input confirming user intent to modify the playback tuning pitch of the audio signal to correspond to the target playback tuning pitch. In some implementations, the user input comprises selection of a target playback tuning pitch value. In some examples, the target playback tuning pitch value is selected from a set of discrete pitch values presented to the user on the user interface.

Act 610 of flow diagram 600 includes modifying the playback tuning pitch of the audio signal based upon the user input.

Act 612 of flow diagram 600 includes receiving additional user input directed to causing playback of the audio signal in accordance with the modified playback tuning pitch.

Act 614 of flow diagram 600 includes playing the audio signal in accordance with the modified playback tuning pitch.

Act 702 of flow diagram 700 of FIG. 7 includes accessing an audio signal. In some instances, the audio signal comprises an audio recording of a song. In some implementations, the audio signal comprises an audio stem separated from an audio recording of a song.

Act 704 of flow diagram 700 includes determining an estimated tuning pitch associated with the audio signal. In some examples, the estimated tuning pitch is obtained by determining a frequency histogram of the audio signal and comparing the frequency histogram to template histograms associated with different tuning pitches to determine a matching template histogram. The estimated tuning pitch can be selected as the tuning pitch associated with template histogram that best matches the frequency histogram of the audio signal. In some instances, the estimated tuning pitch comprises an estimated concert pitch applicable to a song. In some implementations, the estimated tuning pitch comprises a tuning pitch associated with an audio stem.

Act 706 of flow diagram 700 includes automatically modifying a playback tuning pitch of the audio signal based upon the estimated tuning pitch and a target playback tuning pitch. In some examples, the target playback tuning pitch is determined based on an audio recording of a musical instrument. In some instances, the target playback tuning pitch comprises a user-selected pitch value selected from a set of discrete pitch values.

Act 708 of flow diagram 700 includes playing the audio signal in accordance with the modified playback tuning pitch.

Act 802 of flow diagram 800 of FIG. 8 includes accessing an audio signal.

Act 804 of flow diagram 800 includes separating the audio signal into a plurality of audio stems.

Act 806 of flow diagram 800 includes, for at least a particular audio stem of the plurality of audio stems, determining an estimated tuning pitch associated with the particular audio stem.

Act 808 of flow diagram 800 includes presenting the estimated tuning pitch on a user interface.

Act 810 of flow diagram 800 includes receiving user input directed to modifying a playback tuning pitch of the particular audio stem to deviate from the estimated tuning pitch.

Act 812 of flow diagram 800 includes modifying the playback tuning pitch of the particular audio stem based upon the user input.

Act 814 of flow diagram 800 includes receiving additional user input directed to causing playback of the particular audio stem in accordance with the modified playback tuning pitch.

Figure 9:
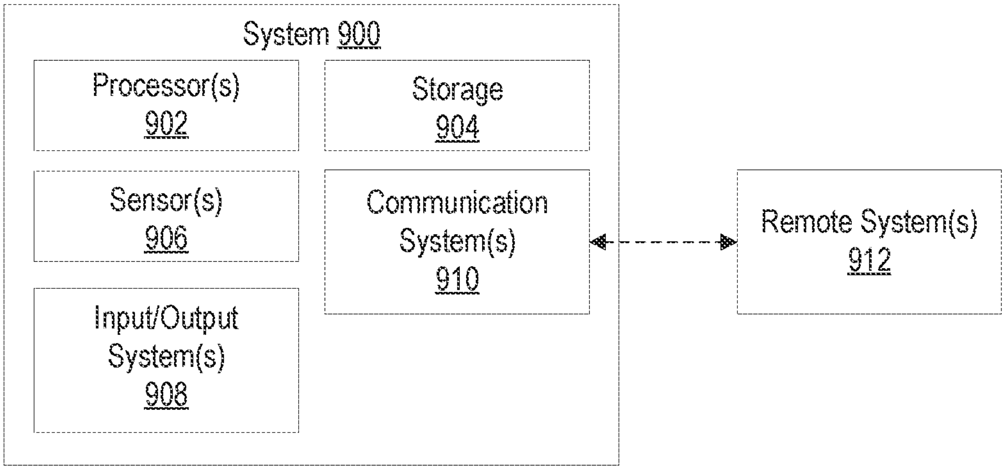
FIG. 9 depicts example components of a system that may comprise or be configurable to perform various embodiments.

Act 816 of flow diagram 800 includes playing the particular audio stem in accordance with the modified playback tuning pitch FIG. 9 illustrates example components of a system 900 that may comprise or implement aspects of one or more disclosed embodiments. For example, FIG. 9 illustrates an implementation in which the system 900 includes processor(s) 902, storage 904, sensor(s) 906, I/O system(s) 908, and communication system(s) 910. Although FIG. 9 illustrates a system 900 as including particular components, one will appreciate, in view of the present disclosure, that a system 900 may comprise any number of additional or alternative components.

The processor(s) 902 may comprise one or more sets of electronic circuitries that include any number of logic units, registers, and/or control units to facilitate the execution of computer-readable instructions (e.g., instructions that form a computer program). Such computer-readable instructions may be stored within storage 904. The storage 904 may comprise physical system memory and may be volatile, non-volatile, or some combination thereof. Furthermore, storage 904 may comprise local storage, remote storage (e.g., accessible via communication system(s) 910 or otherwise), or some combination thereof. Additional details related to processors (e.g., processor(s) 902) and computer storage media (e.g., storage 904) will be provided hereinafter.

As will be described in more detail, the processor(s) 902 may be configured to execute instructions stored within storage 904 to perform certain actions. In some instances, the actions may rely at least in part on communication system(s) 910 for receiving data from remote system(s) 912, which may include, for example, separate systems or computing devices, sensors, and/or others. The communications system(s) 910 may comprise any combination of software or hardware components that are operable to facilitate communication between on-system components/devices and/or with off-system components/devices. For example, the communications system(s) 910 may comprise ports, buses, or other physical connection apparatuses for communicating with other devices/components. Additionally, or alternatively, the communications system(s) 910 may comprise systems/components operable to communicate wirelessly with external systems and/or devices through any suitable communication channel(s), such as, by way of non-limiting example, Bluetooth, ultra-wideband, WLAN, infrared communication, and/or others.

FIG. 9 illustrates that a system 900 may comprise or be in communication with sensor(s) 906. Sensor(s) 906 may comprise any device for capturing or measuring data representative of perceivable phenomenon. By way of non-limiting example, the sensor(s) 906 may comprise one or more image sensors, microphones, thermometers, barometers, magnetometers, accelerometers, gyroscopes, and/or others.

Furthermore, FIG. 9 illustrates that a system 900 may comprise or be in communication with I/O system(s) 908. I/O system(s) 908 may include any type of input or output device such as, by way of non-limiting example, a display, a touch screen, a mouse, a keyboard, a controller, and/or others, without limitation.

Disclosed embodiments may comprise or utilize a special purpose or general-purpose computer including computer hardware, as discussed in greater detail below. Disclosed embodiments also include physical and other computer-readable media for carrying or storing computer-executable instructions and/or data structures. Such computer-readable media can be any available media that can be accessed by a general-purpose or special-purpose computer system. Computer-readable media that store computer-executable instructions in the form of data are one or more "physical computer storage media" or "hardware storage device(s)." Computer-readable media that merely carry computer-executable instructions without storing the computer-executable instructions are "transmission media." Thus, by way of example and not limitation, the current embodiments can comprise at least two distinctly different kinds of computer-readable media: computer storage media and transmission media.

Computer storage media (aka "hardware storage device") are computer-readable hardware storage devices, such as RAM, ROM, EEPROM, CD-ROM, solid state drives ("SSD") that are based on RAM, Flash memory, phase-change memory ("PCM"), or other types of memory, or other optical disk storage, magnetic disk storage or other magnetic storage devices, or any other medium that can be used to store desired program code means in hardware in the form of computer-executable instructions, data, or data structures and that can be accessed by a general-purpose or special-purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmission media can include a network and/or data links which can be used to carry program code in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general-purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Disclosed embodiments may comprise or utilize cloud computing. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

Those skilled in the art will appreciate that at least some aspects of the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, wearable devices, and the like. The invention may also be practiced in distributed system environments where multiple computer systems (e.g., local and remote systems), which are linked through a network (either by hardwired data links, wireless data links, or by a combination of hardwired and wireless data links), perform tasks. In a distributed system environment, program modules may be located in local and/or remote memory storage devices.

Alternatively, or in addition, at least some of the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Application-specific Standard Products (ASSPs), System-on-a-chip systems (SOCs), Complex Programmable Logic Devices (CPLDs), central processing units (CPUs), graphics processing units (GPUs), and/or others.

As used herein, the terms "executable module," "executable component," "component," "module," or "engine" can refer to hardware processing units or to software objects, routines, or methods that may be executed on one or more computer systems. The different components, modules, engines, and services described herein may be implemented as objects or processors that execute on one or more computer systems (e.g., as separate threads).

One will also appreciate how any feature or operation disclosed herein may be combined with any one or combination of the other features and operations disclosed herein. Additionally, the content or feature in any one of the figures may be combined or used in connection with any content or feature used in any of the other figures. In this regard, the content disclosed in any one figure is not mutually exclusive and instead may be combinable with the content from any of the other figures.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A system for facilitating tuning estimation and modification, comprising:

one or more processors; and one or more computer-readable recording media that store instructions that are executable by the one or more processors to configure the system to:

process an audio signal using one or more executable modules to generate estimated tuning pitch output indicating an estimated tuning pitch associated with the audio signal;

present the estimated tuning pitch on a user interface;

receive user input directed to the user interface, wherein the user input indicates a modification to a playback tuning pitch associated with the audio signal;

process the modification to the playback tuning pitch to modify the playback tuning pitch associated with the audio signal such that, after processing of the modification to the playback tuning pitch, the system becomes configured to play back the audio signal using the modified playback tuning pitch rather than the estimated tuning pitch obtained via processing of the audio signal using the one or more executable modules; and after processing the modification to the playback tuning pitch, play back the audio signal using the modified playback tuning pitch rather than the estimated tuning pitch.

2. The system of claim 1, wherein the audio signal comprises an audio recording of a song.

3. The system of claim 2, wherein the estimated tuning pitch comprises an estimated concert pitch applicable to the song.

4. The system of claim 1, wherein the audio signal comprises an audio stem separated from an audio recording of a song.

5. The system of claim 4, wherein the estimated tuning pitch comprises an estimated tuning pitch associated with the audio stem.

6. The system of claim 1, wherein the estimated tuning pitch is obtained by determining a frequency histogram of the audio signal and comparing the frequency histogram to template histograms associated with different tuning pitches to determine a matching template histogram, wherein the estimated tuning pitch is selected as the tuning pitch associated with template histogram that best matches the frequency histogram of the audio signal.

7. The system of claim 1, wherein the estimated tuning pitch comprises a frequency estimation for a reference note.

8. The system of claim 1, wherein the estimated tuning pitch comprises a frequency deviation from a target playback tuning pitch.

9. The system of claim 8, wherein the target playback tuning pitch is determined based on an audio recording of a musical instrument.

10. The system of claim 8, wherein the target playback tuning pitch comprises a user-selected pitch value.

11. The system of claim 10, wherein the user input comprises user input confirming user intent to modify the playback tuning pitch of the audio signal to correspond to the target playback tuning pitch.

12. The system of claim 1, wherein the user input comprises selection of a target playback tuning pitch value.

13. The system of claim 12, wherein the target playback tuning pitch value is selected from a set of discrete pitch values presented to the user on the user interface.

14. A system for facilitating tuning estimation and modification, comprising:

one or more processors; and one or more computer-readable recording media that store instructions that are executable by the one or more processors to configure the system to:

process an audio signal using one or more executable modules to generate estimated tuning pitch output indicating an estimated tuning pitch associated with the audio signal;

after generating the estimated tuning pitch output, determine a modification to a playback tuning pitch based on (i) the estimated tuning pitch determined via the one or more executable modules and (ii) a target playback tuning pitch, wherein the target playback tuning pitch comprises a pre-set user-selected tuning pitch value or is determined by processing an audio recording of a musical instrument;

after determining the modification to the playback tuning pitch, process the modification to the playback tuning pitch of the audio signal such that, after processing of the modification to the playback tuning pitch, the system becomes configured to play back the audio signal using a modified playback tuning pitch rather than the estimated tuning pitch obtained via the one or more executable modules; and after processing the modification to the playback tuning pitch, play back the audio signal using the modified playback tuning pitch rather than the estimated tuning pitch.

15. The system of claim 14, wherein the audio signal comprises an audio recording of a song, and wherein the estimated tuning pitch comprises an estimated concert pitch applicable to the song.

16. The system of claim 14, wherein the audio signal comprises an audio stem separated from an audio recording of a song, and wherein the estimated tuning pitch comprises a tuning pitch associated with the audio stem.

17. The system of claim 14, wherein the estimated tuning pitch is obtained by determining a frequency histogram of the audio signal and comparing the frequency histogram to template histograms associated with different tuning pitches to determine a matching template histogram, wherein the estimated tuning pitch is selected as the tuning pitch associated with template histogram that best matches the frequency histogram of the audio signal.

18. A system for facilitating tuning estimation and modification, comprising:

one or more processors; and one or more computer-readable recording media that store instructions that are executable by the one or more processors to configure the system to:

perform stem separation on an audio signal to separate the audio signal into a plurality of audio stems;

for at least a particular audio stem of the plurality of audio stems, process the particular audio stem using one or more executable modules to generate estimated tuning pitch output indicating an estimated tuning pitch associated with the particular audio stem;

present the estimated tuning pitch on a user interface;

receive user input directed to the user interface, wherein the user input indicates a modification to a playback tuning pitch associated with the particular audio stem;

process the modification to the playback tuning pitch to modify the playback tuning pitch associated with the particular audio stem such that, after processing the modification to the playback tuning pitch, the system becomes configured to play back the particular audio stem using the modified playback tuning pitch rather than the estimated tuning pitch obtained via processing of the particular audio stem using the one or more executable modules; and after processing the modification to the playback tuning pitch, play back the particular audio stem using the modified playback tuning pitch rather than the estimated tuning pitch.

* * * * *